Figures 1, 2:
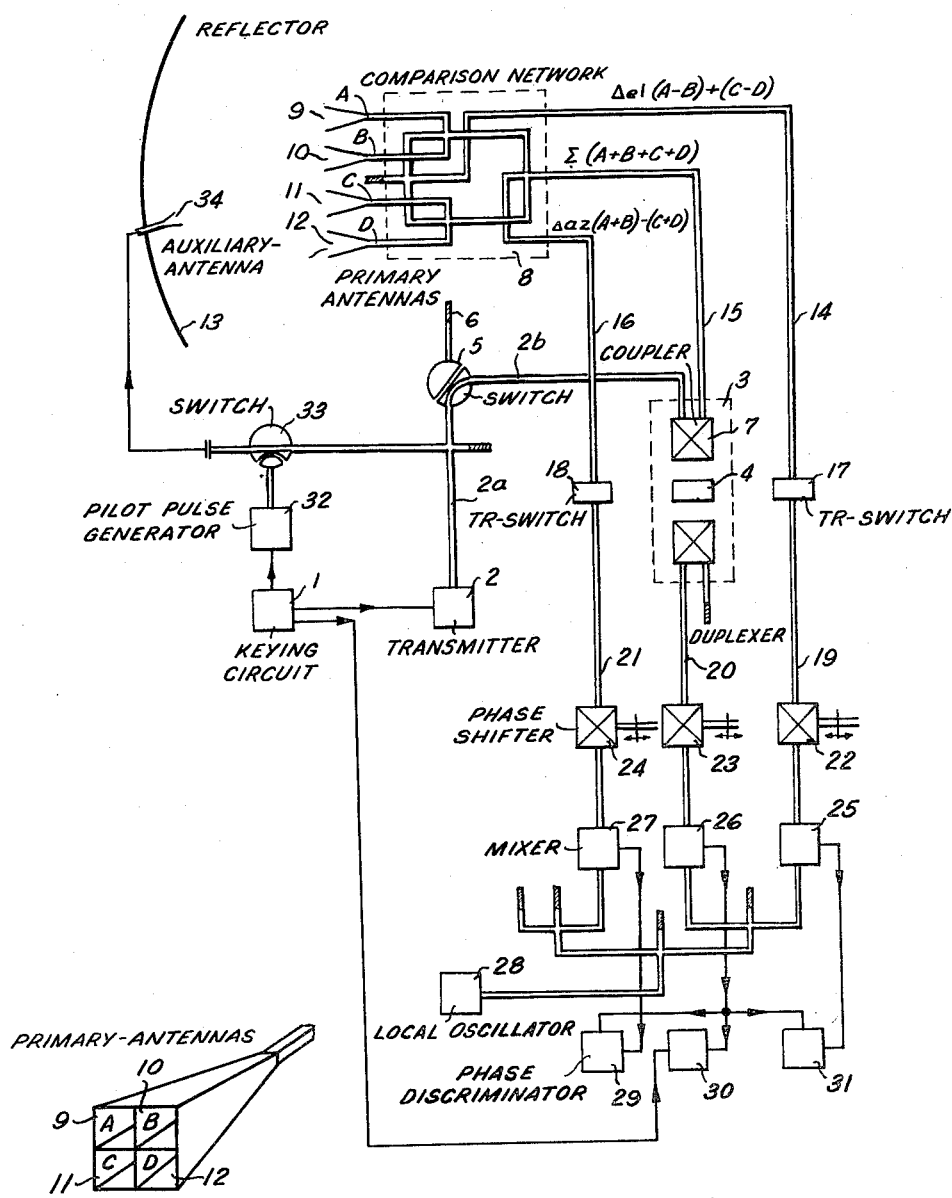

Nov. 30, 1965

H. W. ISCH 3,221,328

SUM-DIFFERENCE DIRECTION-FINDING DEVICE

Filed Nov. 15, 1962

United States Patent Office 3,221,328
Patented Nov. 30, 1965

3,221,328
SUM-DIFFERENCE DIRECTION-FINDING DEVICE
Hans Walter Isch, Genf, Switzerland, assignor to Albiswerk Zurich A.G., Zurich, Switzerland
Filed Nov. 15, 1962, Ser. No. 237,843
Claims priority, application Switzerland, Dec. 1, 1961, 13,976/61
4 Claims. (Cl. 343—16)

This invention pertains to radar systems generally; and, in particular, to a mono-pulse radar system wherein targets (e.g., aircraft) are located by combining sums and differences of the reflected radar signals.

In a mono-pulse radar system, reflected energies, received from a target simultaneously in two or more antennas, are compared for determination of the target position. If the distances between the antennas are finite, the phase difference of the signals received by the various antennas may be detected and compared; ultimately the various signals are processed to provide an accurate location of the target. However, where the distances between or among the various antennas is extremely small, and where the radiation characteristics of the various antennas are mutually off-set or are turning relative to each other, the angle and range differences among the antennas relatve to the target are detected by comparing the magnitude of the received electro-magnetic energies received by each of the antennas.

A radar system in which reflected electro-magnetic signals received by plural antennas are compared as to their phase differences is disclosed in United States Patent No. 2,830,288 entitled "Lobing System," issued April 8, 1958, to R. H. Dicke. In the phase-comparison radar system disclosed in this patent, four primary antennas are symmetrically arranged about the focal point of a reflector. The four primary antennas constituting the antenna system are each supplied with energy so as to produce a single directional beam when the system is in the transmission mode of operation. When the system is in the receiving mode of operation, the signals received by the aforementioned individual antennas are separated and subsequently recombined to provide information signals as to points in at least two planes; e.g., in the vertical plane and in the horizontal plane. In addition, the main beam of energy reflected from the target is used as a reference signal. Ultimately, the information-containing signals, relative to the target's direction and the reference signal, are processed to provide control signals which may be used to actuate display devices or error correction apparatus.

When the radar system is in its receiving mode, the individual signals received by the respective four antennas are designated as signals A, B, C and D. Subsequently, each of these received signals A, B, C and D are superimposed in a comparison network to provide three signals:

(1) A reference signal which is the sum of the four received signals; i.e., $A+B+C+D$. This reference signal $A+B+C+D$ is used as a reference for evaluating the target's distance and serves for the control of the display unit of the radar system.

(2) A first differential signal $(A+C)-(B-D)$ is also derived in the comparison network. This first differential signal contains information relation to the target's angle of elevation.

(3) Also a second differential signal $(A+B)-(C+D)$ is derived in the comparison network. This second differential signal contains information relative to the target's angle in a horizontal plane with reference to the radar system, or azimuth of the target.

The reference signal $A+B+C+D$, depending on where the target is, is either in phase or in phase opposition with the differential signals (first differential signal and second differential signal) and yields, after phase comparison, an information on the direction of the error signal.

These three information signals (the reference signal, the first differential signal and the second differential signal) are translated from the comparison network by individual wave guides to individual mixing stages. In the mixing stages, each of these signals is transferred to an intermediate frequency carrier (I.F. carrier), and is subsequently amplified in an I.F. amplifier. After amplification, the signals may be processed in a conventional manner to provide a visual indication of the target's location. In addition, the amplified control signals may, for purposes of fire control, be fed to error correction apparatus for the purpose of directing guns at a moving target.

The comparison network employed is preferably constructed in the form of the well known "Magic Tee"; the "Magic Tee" being set forth in full detail in the aforementioned United States Patent 2,830,288 and the patents referred to therein. In mono-pulse radar systems, as disclosed by Dicke in the aforementioned United States Patent, the precision with which the target is located in dependent, in the main, on the precision with which the comparison network functions. For example, it is indispensable that the individual received signals A, B, C and D be passed through electrically identical conductor means between the input stage of the primary antennas and the inputs to the phase comparison network; it being extremely important that these conductor means are electrically identical in the phase displacement of the individual signal being translated. With presently known techniques for the fabrication of wave guides, it is possible to construct several wave guides having the same electrical length and corresponding identical phase displacement of the waves being translated, by mounting wave guides of identical geometric lengths. However, where reflectors are used in combination with the primary antennas and the wave guide elements of the comparison network and where the primary antennas are supplied on the radiating side of the reflector, it is extremely difficult to arrange the wave guide elements with respect to the radiating surface of the reflector in such a manner that the radiating surface is covered by as small an area as possible by the wave guides. Where the wave guides have equal electrical length, it has been found that this is extremely difficult to realize as a practical matter.

With respect to phase calibration of the system, it is both expensive and it is considerably difficult to adjust the wave guides so that the required signal phasing can be achieved. Generally, phase calibration requires that a test signal be coupled with each of the wave guides. The test signal has to be of the same relative phase in all wave guides with regard to a reference plane. Although it is possible to use a directional coupler device for the purpose of introducing the calibrated test signal into the various wave guides, this has been found to be very expensive. Moreover, the required phase precision is extremely difficult to achieve and maintain. Another possible way of phase calibrating a system is to couple the calibrated test signal into the comparison network by means of "Magic Tees." The phase front of the test signal (which is of the same phase with regard to a reference plane) is coupled into the wave guides by means of a cross coupling device. With identical cross coupling devices and identical electrical lengths of the wave guides, the coupling of the calibrated test signal waves is made possible with the precision required.

However, such coupling of the calibrated test signal into the comparison network presents considerable difficulty. The coupling has to be effected as close as possible to the camparison network. Considerable difficulty is involved in such an arrangement because the comparison network is situated at the focal point of the parabolic reflector or reflecting lens. According to the present state of the art, the coupling arrangement just referred to would require a relatively large, highly complex, wave guide arrangement situated at the focal point of the reflector. Furthermore, such an arrangement would require an additional high frequency supply for the comparison network. Unfortunately, such an arrangement would result in a degradation of the radiation characteristics of the system.

Accordingly, one object of the present invention is to provide a new and improved sum difference object locating system.

Another object of the present invention is to provide a system and means for calibrating a mono-pulse radar system without the necessity for using large size relatively complicated wave guides.

Another object of the invention is to provide a system and means for generating substantially equal wave fronts in wave guides.

According to one embodiment of the present invention, there is provided an auxiliary antenna in combination with a reflector; the auxiliary atenna radiating a calibrating signal. The auxiliary antenna is so arranged, with respect to the reflector and the primary antennas, that the calibrating signal waves which are received by each of the primary antennas generate, in a comparison network, sum and difference signals which are of substantially equal phase at the output ports of the comparison network. Wave guide means are employed to translate these sum and difference signals, which are in equal phase relationship, to a mixing network. In each of these wave guides, there is included a phase shifter. The phase shifters enable adjustment of the electrical length of the wave guide means to equal electrical length; the wave guides being coupled between the output of the comparison network and the mixing stages.

The aforementioned objects as well as others hereinafter appearing, the various features and advantages of the invention as well as a fuller appreciation thereof is to be had by referring to the following detailed description of one embodiment thereof and to the accompanying drawing, in which the single figure is an illustration, partly in schematic form and partly in block diagram form, of the radar system of the present invention.

As shown in the drawing, a transmitter 2, including a modulator and one or more magnetrons, is controlled by a keying circuit 1 to cause the transmitter 2 to provide an output signal of predetermined duration containing containing high frequencies. The high frequency output signal from the transmitter 2 is conducted via the hollow wave guide sections 2a and 2b to a duplexer designated generally by the reference number 3. Included in the duplexer 3 are a transmit-receive ($t-r$) switch 4 and a directional coupler 7. As illustrated, there is a hollow wave guide switching device 5 provided between the hollow wave guides 2a and 2b.

The hollow wave guide switch 5 functions to translate the signal wave in the hollow wave guide 2a to the hollow wave guide 2b and ultimately into the directional coupler 7. As indicated schematically at the drawing figure, the wave guide switch 5 may be turned to direct the electromagnetic wave in the hollow wave guide 2a into a reflection-free load element 6; or, the wave guide switching mechanism 5 may, in accordance with the drawing figure, couple the energy from wave guide 2a into the wave guide 2b.

The wave energy put into the directional coupler 7 via the hollow wave guide 2b may be reflected in the directional coupler 7 by the functioning of the $t-r$ switch in order to couple the wave energy into the wave guide 15 and ultimately into the comparison network 8.

The comparison network 8 is comprised of four "Magic Tees" and is disclosed in the United States Patent No. 2,830,288, hereinbefore cited.

When the radar system illustrated in the drawing is in its transmitting mode of operation, the wave guide 15 translates the entire electro-magnetic energy which is ultimately distributed and transmitted as a single directive beam by the four primary antennas 9, 10, 11 and 12. The comparison network 8 functions in the transmitting mode to distribute electro-magnetic energy to each of the four primary antennas which, in turn, radiate a portion of the total energy, each antenna radiating energy in phase. The four portions of the transmitted energy radiated by the primary antennas 9–12 combine to provide a single radiated directional beam of electro-magnetic energy.

When the radar system illustrated in the drawing is in its receiving mode of operation, reflected electro-magnetic energy from a target (e.g., an aircraft) reaches the parabolic reflector 13. The parabolic reflector 13, in turn, focuses the received electro-magnetic energy toward the four primary antennas 9–12. Depending on the location of the remote target from the rotational axis of the reflector 13 about which the four primary antennas 9–12 are symmetrically arranged, the electro-magnetic energy portions received by each of the primary antennas are different. In the following discussion it is assumed that these four received energy portions are designated as A, B, C, and D.

In the comparison network 8, a summation signal and two differential signals are formed in a known manner. See, for example, U.S. Patent No. 2,830,288. The summation signal being $A+B+C+D$; the first differential signal being $(A+C)-(B+D)$; and, the second differential signal being $(A+B)-(C+D)$. By means of the three hollow wave guides 14, 15 and 16, the three hereinbefore mentioned signals are translated, respectively, to the duplexer 3 and to the transmit-receive ($t-r$) networks 17 and 18. The hollow wave guide 15 translates the summation signal. The hollow wave guide 14 translates the first differential signal and the hollow wave guide 16 translates the second differential signal.

The three $t-r$ circuit elements 4, 17 and 18 are such that they are in a conductive state for the received energy signals. From the three $t-r$ circuit elements, the three signals are guided through the hollow wave guides 19, 20 and 21 to the phase shifters 22, 23 and 24. Subsequently, the three signals, after being translated through the phase shifters, are coupled into the three mixing stages 25, 26 and 27.

The phase shifters, 22, 23 and 24 include means for enabling the adjustment thereof for the purpose of making the electrical length of the wave guide conductors between the comparison network 8 and the mixers 25, 26 and 27 of equal electrical length and like electrical properties. As indicated in the drawing figure, a local oscillator 28, coupled by suitable wave guide means with each of the mixers 25, 26 and 27, provides energy signals of the same phase to each of the mixing stages. Accordingly, the resultant output signals from the three mixers 25, 26 and 27 directed into the three phase discriminators 29, 30 and 31 are at a suitable intermediate frequency (I.F.). The I.F. signal output from the three mixers 25, 26 and 27 is an amplified output; the mixing stages including amplification means.

As illustrated, a calibrating oscillator or pilot pulse generator 32, coupled with the pulse keying means 1, is supplied with trigger pulses from the pulse keying means 1. The pulses generated by the calibrating oscillator 32 have a frequency corresponding to the transmission frequency of the subject radar system and, in addition, have a predetermined delay relative to the transmitting pulses. The calibrating pulse output from the calibrating oscillator 32 is translated, via the hollow wave guide switching means 33, to an auxiliary antenna 34.

In order to generate in the three wave guides 14, 15 and 16 three signals having exactly the same phase, the auxiliary antenna 34 should be equally distant from all of the primary antennas 9–12. This condition is obtainable only when the auxiliary antenna 34 is situated at the central axis of the reflector 13. However, this is not a practical arrangement because the differential signals would become zero and thus not produce an error signal which is detectable by the discriminators. An off-setting of the auxiliary antenna 34 from the central axis of the reflector 13 causes, primarily, only a change in the amplitudes of the signals which are received by the primary antennas 9–12; however, the phase relationships are changed to only an immeasurable, or negligible, extent. The very small phase changes cannot be measured accurately to provide significant information. While the maximum off-setting of the auxiliary antenna 34 from the central axis of the reflector depends on the dimensions of the primary antennas 9–12, the off-setting of the auxiliary antenna should not be so great that a different phase angle would be produced. Another prerequisite for positioning of the auxiliary antenna 34 relative to the primary antennas 9–12 is that both an error signal for elevation and also an error signal for azimuth are to be produced. In order to meet this latter condition, it has been found that conditions are most favorable if both error signals are of equal magnitude. This is accomplished by arranging the auxiliary antenna 34 in an attitude diagonal to the primary antennas 9–12; i.e., as indicated in the drawing.

By arranging the auxiliary antenna 34 diagonally in relation to the primary antennas, accurate direction finding is accomplished and, moreover, the electrical length equalization of the wave guides 14, 15 and 16 may be accomplished. Other adjustments are also enabled. Accordingly, error signals can be examined in any desired point of an error voltage curve. The auxiliary antenna 34 is arranged relative to the primary antennas 9–12 in such a manner that the signals in the wage guides 14, 15 and 16 are oriented in relation to each other as prescribed by the point to be examined on the error voltage curve.

By introducing a signal of known amplitude into the wave guides 14, 15 and 16, the sensitivity of the direction finding characteristics of the system can be measured directly.

Further, the exact zero distance can also be obtained by introducing the calibrating signal at the same time that the pulses are transmitted by the primary antennas 9–12. To accomplish this, the transmitter 2 is connected by the wave guide switching means 5 with the load 6, and, at the same time, the wave guide switching means 33 is coupled with the auxiliary antenna 34.

While specific embodiments of the invention have been shown and described in detail to illustrate the application of the inventive principles, it will be understood that the invention may be embodied otherwise without departing from such principles.

What is claimed is:

1. A sum-difference type monopulse radar locating apparatus comprising, in combination, a plurality of primary transmitting and receiving antennas; means for supplying generated radio energy to said antennas at a preselected frequency; a reflector spaced from said primary antennas and focusing received radio energy to said primary antennas; a received energy comparison network connected to said primary antennas to provide a sum signal and two difference signals at the outlet ports of said comparison network; an auxiliary antenna mounted within said reflector and facing said primary antennas; means for supplying energy to said auxiliary antenna at a frequency corresponding to the supply of generated radio energy to said antennas, for said auxiliary antenna to radiate a calibrating signal to all of said primary antenns; said auxiliary antenna being so positioned within said reflector with respect to said primary antennas that the energy radiated by said auxiliary antenna and received by said primary antennas generates, in said comparison network, summation and difference signals which are of substantially equal phase at the outlet ports of said comparison network.

2. A sum-difference type object locating apparatus, as claimed in claim 1, including a plurality of mixing stages; hollow conductor means connecting said comparison networks to each of said mixing stages; and a plurality of phase shifters each interposed in a respective hollow conductor between said comparison network and a respective mixing stage.

3. A sum-difference type object locating apparatus, as claimed in claim 1, in which said calibrating signal for said auxiliary antenna is provided by a calibrating oscillator connected between said means for delivering generated radio energy to said plurality of antennas and said auxiliary antenna.

4. A sum-difference type locating apparatus, as claimed in claim 1, wherein said auxiliary antenna is offset with respect to the focal point of said reflector.

References Cited by the Examiner

UNITED STATES PATENTS

| | | | |
|---|---|---|---|
| 2,626,391 | 1/1953 | O'Brien | 343—105 |
| 2,881,423 | 4/1959 | Jacobson et al. | 343—16.1 |
| 2,961,654 | 11/1960 | Simon | 343—17.7 |
| 3,143,736 | 8/1964 | Midlock | 343—17.7 |

CHESTER L. JUSTUS, *Primary Examiner.*